(12) United States Patent
Atilgan

(10) Patent No.: US 11,390,336 B2
(45) Date of Patent: Jul. 19, 2022

(54) BALANCE WEIGHT OF STEEL AND HEAVY CONCRETE COMPONENTS AND METHOD OF PRODUCTION BASED THEREON

(71) Applicant: Ugur Beton Metal Ve Plastik Sanayi Turizm Ticaret Limited Sirketi, Tekirdag (TR)

(72) Inventor: Ugur Atilgan, Tekirdag (TR)

( * ) Notice: Subject to any disclaimer, the term of this patent is extended or adjusted under 35 U.S.C. 154(b) by 256 days.

(21) Appl. No.: 16/649,853

(22) PCT Filed: Oct. 29, 2018

(86) PCT No.: PCT/TR2018/050633
§ 371 (c)(1),
(2) Date: Mar. 23, 2020

(87) PCT Pub. No.: WO2019/221678
PCT Pub. Date: Nov. 21, 2019

(65) Prior Publication Data
US 2021/0163084 A1 Jun. 3, 2021

(30) Foreign Application Priority Data
May 18, 2018 (TR) ................................ 2018/07042

(51) Int. Cl.
*B62D 49/08* (2006.01)
*C04B 28/00* (2006.01)
*C04B 111/00* (2006.01)

(52) U.S. Cl.
CPC .......... *B62D 49/085* (2013.01); *C04B 28/00* (2013.01); *C04B 2111/0031* (2013.01)

(58) Field of Classification Search
None
See application file for complete search history.

(56) References Cited

U.S. PATENT DOCUMENTS

| | | | | |
|---|---|---|---|---|
| 6,080,234 A | * | 6/2000 | Clavaud | C04B 28/02 106/710 |
| 8,921,463 B1 | * | 12/2014 | Alqahtani | C04B 28/04 524/8 |
| 2002/0182395 A1 | * | 12/2002 | Svedberg | B28B 1/084 106/644 |
| 2003/0075457 A1 | * | 4/2003 | Buenfeld | C04B 28/02 205/734 |

FOREIGN PATENT DOCUMENTS

| | | |
|---|---|---|
| CN | 2671834 Y | 1/2005 |
| CN | 203221829 U | 10/2013 |
| KR | 20030080308 A | 10/2003 |
| KR | 20090123103 A | 12/2009 |
| WO | 2018226181 A3 | 12/2018 |

OTHER PUBLICATIONS

International Search Report for corresponding PCT/TR2018/050633.
Written Opinion of the ISA for corresponding PCT/TR2018/050633.

* cited by examiner

*Primary Examiner* — John J Figueroa
(74) *Attorney, Agent, or Firm* — Egbert, McDaniel & Swartz, PLLC

(57) ABSTRACT

Disclosed is a balance weight of steel and heavy concrete components and a production method for the balance weight, as an alternative to pig casting and spheroidal graphite casting.

4 Claims, 1 Drawing Sheet

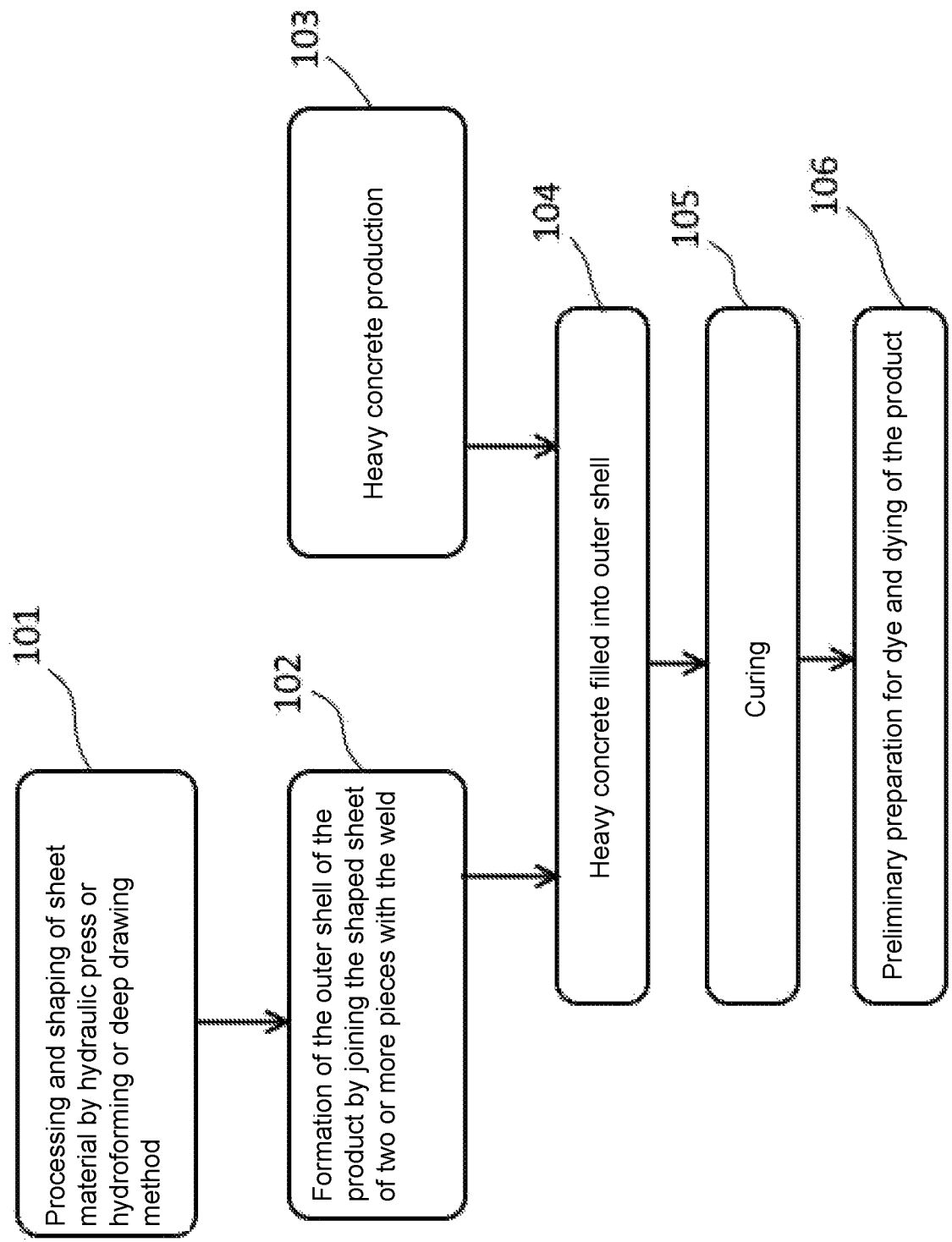

BALANCE WEIGHT OF STEEL AND HEAVY CONCRETE COMPONENTS AND METHOD OF PRODUCTION BASED THEREON

FIELD OF THE INVENTION

The invention relates to balance weights used in sectors, including tractors and agricultural machinery, that currently need casting weight.

The invention relates in particular to the balance weight of steel and heavy concrete components and a production method for the said balance weight, as an alternative to pig casting and spheroidal graphite casting, used in connection with the design of the producers in the front and rear regions of tractors or different agricultural machines.

PRIOR ART

At present, balance weights, which are called as balance weight, are mounted on the front and rear part of the vehicle according to the conditions of the land and the operations to be applied to the land, especially in tractors and agricultural machines.

In this way, the balance of the tractor or agricultural machine can be adjusted according to the variable terrain and load conditions and the position of the center of gravity can be adjusted as desired. In the present art, the balance weights are produced as pig castings and spheroidal castings. Because of the high cost of pig steel raw materials, the product costs of existing balance weights are also quite high. Furthermore, preparing different casting molds for each balance weight for casting is another factor that increases the cost. Furthermore, since non-recyclable materials are used in existing balance weights, reutilization of the raw materials is not possible.

No patent which is similar to the balance weight of the invention was found in the performed patent search. However, some patents made in the related technical field are explained below.

A balance weight made entirely of concrete is disclosed by the utility model of the publication number CN203221829U.

The utility model of the publication number CN2671834Y disclosed a concrete weight concrete structure of which was reinforced. The corresponding concrete structure is produced from cement mortar reinforced with fiber material. It is connected by being screwed on the wheel by the openings provided on the concrete weight.

OBJECTIVE OF THE INVENTION

The objective of the invention is to develop a balance weight consisting of steel and heavy concrete components and a production method for the said balance weight, as an alternative to pig casting and spheroidal graphite casting.

Another objective of the invention is to reduce the product cost and contribute to the economy of the country by means of the balance weight consisting of steel and heavy concrete components.

Another objective of the invention is to recover the raw materials by using recycled materials in the heavy concrete mixture used in equilibrium weight.

Another objective of the invention is to reduce the process and moulding costs by removing the casting mold manufacturing required for the balance weights of the pig casting and spheroidal graphite casting.

SHORT DESCRIPTION OF THE DRAWINGS

FIG. 1 is a workflow diagram of the production method pertaining to the balance weight of the invention.

REFERENCE NUMBERS OF THE FIGURES

101. Processing and shaping of sheet material by hydraulic press or hydroforming or deep drawing method

102. Formation of the outer shell of the product by joining the shaped sheet of two or more pieces with the weld

103. Heavy concrete production

104. Heavy concrete filled into outer shell

105. Curing

106. Preliminary preparation for dye and dying of the product.

DETAILED DESCRIPTION OF THE INVENTION

The invention relates to the balance weight of steel and heavy concrete components and an improved method of production for the said balance weight, as an alternative to pig casting and spheroidal graphite casting.

The balance weight of the invention comprises steel sheet and components between 10% and 60% by weight and heavy concrete components between 40% and 90% by weight.

The heavy concrete mixture contains cement between 10% and 30% by weight, iron ore between 20% and 50% by weight, scale between 20% and 60% by weight, and other aggregates between 5% and 10% by weight. Recycled material is used as much as the scale amount used within the heavy concrete mixture.

FIG. 1 shows the work flow diagram of the method of producing the balance weight composed of steel sheet and its components and heavy concrete components.

The balance weight production method of the invention generally comprises the processes of shaping the outer sheet by method of press printing, hydroforming or deep drawing and forming the outer shell, filling and curing the heavy concrete mixture in the heavy concrete production and outer shell, finally making the preliminary preparation of dye and having the final form of the product by being dyed.

Outer shell forming: The outer sheet is shaped by press printing or hydroforming or deep drawing, and the outer shell is formed by combining the shaped sheet material consisting of two or more shaped parts by the method of welding.

Heavy Concrete Production: Heavy concrete components are prepared by mixing in the mixer according to the corresponding recipe. The prepared heavy concrete and other metal components are placed into the product through the filling end of the outer shell and are held for setting in the intermediate product ware for 12-36 hours according to air and ambient temperature under the conditions of curing.

Product Preparation and Dye: The filling opening of the cured product is closed by welding sheet. The dye is prepared and the product is dyed and finalized.

The balance weight consisting of steel and heavy concrete components thus reduces the cost of the product and contributes to the economy of the country.

Recycling of raw materials is achieved by using recycled materials in the heavy concrete mix used in the balance weight. In addition, process and mold costs are lowered by eliminating the production of casting molds required for balance weights of pig casting and spheroidal graphite casting, and a product is developed with no alternative one.

The invention claimed is:

1. A balance weight composition for use in applications that require a casting weight, the balance weight composition comprising:
    sheet steel between 10% and 60% by weight of the balance weight composition;
    a concrete mixture between 40% and 90% by weight of the balance weight composition, wherein said concrete mixture comprises cement between 10% and 30 by weight, iron ore between 20% and 30% by weight, scale between 20% and 60% by weight, and aggregates between 5% and 10% by weight, wherein said sheet steel and said concrete mixture are no more than 100% by weight of the balance weight composition, wherein the cement and the iron ore and the scale and the aggregates are no more than 100% by weight of the concrete mixture.

2. The balance weight composition of claim 1, wherein the scale is of recycleable material.

3. A method of producing a balance weight for applications that require a casting weight, the method comprising:
    processing and shaping a sheet material with at least one of hydraulic pressing, hydroforming and deep drawing;
    forming an outer shell by joining the processed and shaped sheet material of at least two pieces with a weld;
    producing a heavy concrete;
    filling the outer shell with the produced heavy concrete;
    curing the heavy concrete after the step of filling the outer shell with the produced heavy concrete so as to have a filling opening of the cured heavy concrete;
    closing the filling opening by welding the processed and shaped sheet material; and
    dyeing the balance weight with a dye preparation.

4. The method of claim 3, wherein the stop of curing is carried out for between 12 hours and 36 hours.

* * * * *